US011863379B2

United States Patent
Shimoga Manjunatha et al.

(10) Patent No.: US 11,863,379 B2
(45) Date of Patent: ***Jan. 2, 2024

(54) CONTAINER CLUSTER MANAGEMENT

(71) Applicant: Hewlett Packard Enterprise Development LP, Houston, TX (US)

(72) Inventors: Praveen Kumar Shimoga Manjunatha, Bangalore Karnataka (IN); Sonu Sudhakaran, Bangalore Karnataka (IN); Ravikumar Vallabhu, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,008

(22) Filed: Sep. 7, 2021

(65) Prior Publication Data

US 2021/0399946 A1    Dec. 23, 2021

Related U.S. Application Data

(63) Continuation of application No. 15/994,796, filed on May 31, 2018, now Pat. No. 11,128,530.

(30) Foreign Application Priority Data

Mar. 29, 2018  (IN) .............................. 201841012009

(51) Int. Cl.
*G06F 15/173*   (2006.01)
*H04L 41/0813*  (2022.01)
(Continued)

(52) U.S. Cl.
CPC ........ *H04L 41/0813* (2013.01); *G06F 9/5083* (2013.01); *H04L 43/0876* (2013.01);
(Continued)

(58) Field of Classification Search
CPC .............. H04L 45/586; H04L 67/1034; G06F 9/45558; G06F 9/5088; G06F 11/3452; G06F 11/3442; G06F 9/547; H04W 4/08
See application file for complete search history.

(56) References Cited

U.S. PATENT DOCUMENTS 6,392,990 B1   5/2002  Tosey et al.
6,801,949 B1  10/2004  Bruck et al.
(Continued)

FOREIGN PATENT DOCUMENTS

| CN | 103957237 A | 7/2014 |
|---|---|---|
| CN | 106888254 A | 6/2017 |
| WO | 2012/057956 A2 | 5/2012 |

OTHER PUBLICATIONS

Amazon Web Services, Inc., "Elastic Load Balancing," 2017, pp. 1-7.

(Continued)

*Primary Examiner* — Dustin Nguyen
(74) *Attorney, Agent, or Firm* — Slater Matsil, LLP (57) ABSTRACT

In an example, a container cluster management system includes a first node, a second node and redistribution manager. The first node has an allocated external IP address, and comprises a utilization monitor to provide data relating to a utilization of the first node. The redistribution manager may receive the data relating to the utilization of the first node from the first node and determine whether the utilization of the first node has exceeded a predetermined threshold. Responsive to the utilization exceeding the predetermined threshold, the redistribution manager may reallocate the external IP address from the first node to the second node.

20 Claims, 5 Drawing Sheets

(51) Int. Cl.
*H04L 43/0876* (2022.01)
*H04L 43/16* (2022.01)
*H04L 47/122* (2022.01)
*H04L 67/1008* (2022.01)
*G06F 9/50* (2006.01)

(52) U.S. Cl.
CPC ............ *H04L 43/16* (2013.01); *H04L 47/122* (2013.01); *H04L 67/1008* (2013.01)

(56) References Cited

U.S. PATENT DOCUMENTS

| | | |
|---|---|---|
| 7,200,865 B1 | 4/2007 | Roscoe et al. |
| 7,299,294 B1 | 11/2007 | Bruck et al. |
| 7,373,644 B2 | 5/2008 | Aborn |
| 7,546,354 B1 | 6/2009 | Fan et al. |
| 7,657,501 B1 | 2/2010 | Brown et al. |
| 7,962,582 B2 | 6/2011 | Potti et al. |
| 8,306,951 B2 | 11/2012 | Ghosh et al. |
| 8,434,080 B2 | 4/2013 | Yendluri |
| 8,706,798 B1 | 4/2014 | Suchter et al. |
| 8,738,972 B1* | 5/2014 | Bakman ............ G06F 11/3442 714/47.1 |
| 8,806,605 B1 | 8/2014 | Chickering |
| 8,954,979 B1 | 2/2015 | Myers et al. |
| 9,027,087 B2 | 5/2015 | Ishaya et al. |
| 9,141,410 B2 | 9/2015 | Leafe et al. |
| 9,143,530 B2 | 9/2015 | Qureshi et al. |
| 9,154,367 B1 | 10/2015 | Kontothanassis et al. |
| 9,304,999 B1 | 4/2016 | Bono et al. |
| 9,471,798 B2 | 10/2016 | Vepa et al. |
| 9,529,996 B2 | 12/2016 | Qureshi et al. |
| 9,563,480 B2 | 2/2017 | Messerli et al. |
| 9,634,948 B2 | 4/2017 | Brown et al. |
| 9,692,727 B2 | 6/2017 | Zhou et al. |
| 9,755,898 B2 | 9/2017 | Jain et al. |
| 9,813,307 B2 | 11/2017 | Walsh et al. |
| 9,819,699 B1 | 11/2017 | Nenov |
| 9,870,412 B2 | 1/2018 | Ghosh et al. |
| 9,935,829 B1 | 4/2018 | Miller et al. |
| 9,935,834 B1 | 4/2018 | Baveja et al. |
| 9,965,377 B1 | 5/2018 | Russell et al. |
| 9,985,894 B1 | 5/2018 | Baveja et al. |
| 10,033,631 B1 | 7/2018 | Baveja et al. |
| 10,075,429 B2 | 9/2018 | Jayanti et al. |
| 10,091,112 B1 | 10/2018 | Sharma et al. |
| 10,091,238 B2 | 10/2018 | Shieh et al. |
| 10,110,668 B1 | 10/2018 | Sharma et al. |
| 10,133,619 B1 | 11/2018 | Nagpal et al. |
| 10,142,226 B1* | 11/2018 | Wu ....................... H04L 45/586 |
| 10,181,047 B2 | 1/2019 | Lim |
| 10,191,758 B2 | 1/2019 | Ross et al. |
| 10,191,778 B1 | 1/2019 | Yang et al. |
| 10,284,473 B1 | 5/2019 | Sharma et al. |
| 10,326,672 B2 | 6/2019 | Scheib et al. |
| 10,333,986 B2 | 6/2019 | Lian et al. |
| 10,348,767 B1 | 7/2019 | Lee et al. |
| 10,367,787 B2 | 7/2019 | Gupta et al. |
| 10,382,329 B1 | 8/2019 | Thomas et al. |
| 10,432,638 B2 | 10/2019 | Nambiar et al. |
| 10,439,987 B2 | 10/2019 | Church et al. |
| 10,445,197 B1 | 10/2019 | Harpreet |
| 10,469,389 B1 | 11/2019 | Sharma et al. |
| 10,491,522 B2 | 11/2019 | Sharma et al. |
| 10,530,747 B2 | 1/2020 | Saxena |
| 10,574,513 B2 | 2/2020 | Nagarajan et al. |
| 10,608,881 B2 | 3/2020 | Teng et al. |
| 10,608,990 B2 | 3/2020 | Parvanov et al. |
| 10,659,523 B1 | 5/2020 | Joseph et al. |
| 10,698,714 B2 | 6/2020 | Krishnamurthy et al. |
| 10,708,082 B1 | 7/2020 | Bakiaraj et al. |
| 10,708,230 B2 | 7/2020 | Huang et al. |
| 10,782,990 B1* | 9/2020 | Suarez ................. G06F 11/301 |
| 10,791,144 B1 | 9/2020 | Golan et al. |
| 2002/0049859 A1 | 4/2002 | Bruckert et al. |
| 2003/0018927 A1 | 1/2003 | Gadir et al. |
| 2003/0217134 A1 | 11/2003 | Fontoura et al. |
| 2004/0088408 A1 | 5/2004 | Tsyganskiy |
| 2004/0215639 A1 | 10/2004 | Bamford et al. |
| 2007/0060143 A1 | 3/2007 | Bhatti |
| 2007/0083725 A1 | 4/2007 | Kasiolas et al. |
| 2007/0156842 A1* | 7/2007 | Vermeulen .............. G06F 9/547 709/217 |
| 2010/0287263 A1 | 11/2010 | Liu et al. |
| 2011/0071981 A1 | 3/2011 | Ghosh et al. |
| 2012/0233668 A1 | 9/2012 | Leafe et al. |
| 2013/0046731 A1 | 2/2013 | Ghosh et al. |
| 2013/0159487 A1 | 6/2013 | Patel et al. |
| 2013/0205028 A1 | 8/2013 | Crockett et al. |
| 2013/0212264 A1 | 8/2013 | Troppens et al. |
| 2013/0219010 A1 | 8/2013 | Mahendran et al. |
| 2013/0326507 A1 | 12/2013 | McGrath et al. |
| 2014/0047084 A1 | 2/2014 | Breternitz et al. |
| 2014/0130054 A1 | 5/2014 | Molkov et al. |
| 2014/0215057 A1 | 7/2014 | Walsh et al. |
| 2014/0282889 A1 | 9/2014 | Ishaya et al. |
| 2015/0082417 A1 | 3/2015 | Bhagwat et al. |
| 2015/0134822 A1 | 5/2015 | Bhagwat et al. |
| 2015/0156183 A1 | 6/2015 | Beyer et al. |
| 2016/0021026 A1 | 1/2016 | Aron et al. |
| 2016/0094668 A1 | 3/2016 | Chang et al. |
| 2016/0170668 A1 | 6/2016 | Mehra |
| 2016/0205518 A1* | 7/2016 | Patel ....................... H04W 4/08 455/518 |
| 2016/0212012 A1 | 7/2016 | Young et al. |
| 2016/0359697 A1 | 12/2016 | Scheib et al. |
| 2017/0004057 A1* | 1/2017 | Brown ................ H04L 67/1034 |
| 2017/0063722 A1* | 3/2017 | Cropper ............. G06F 9/45558 |
| 2017/0093661 A1 | 3/2017 | Deulgaonkar et al. |
| 2017/0199770 A1* | 7/2017 | Peteva ................... G06F 9/5088 |
| 2017/0331739 A1 | 11/2017 | Sharma et al. |
| 2018/0019969 A1 | 1/2018 | Murthy |
| 2018/0063025 A1 | 3/2018 | Nambiar et al. |
| 2018/0157508 A1 | 6/2018 | Chen et al. |
| 2018/0205652 A1 | 7/2018 | Saxena |
| 2018/0234459 A1 | 8/2018 | Kung et al. |
| 2018/0295036 A1 | 10/2018 | Krishnamurthy et al. |
| 2018/0331969 A1 | 11/2018 | Chen et al. |
| 2018/0336113 A1* | 11/2018 | Asawa ................ G06F 11/3452 |
| 2018/0359218 A1 | 12/2018 | Church et al. |
| 2018/0367371 A1 | 12/2018 | Nagarajan et al. |
| 2019/0097975 A1 | 3/2019 | Martz et al. |
| 2019/0102226 A1 | 4/2019 | Caldato et al. |
| 2019/0116110 A1 | 4/2019 | Raney |
| 2019/0163559 A1 | 5/2019 | Takahashi et al. |
| 2020/0099610 A1 | 3/2020 | Heron et al. |
| 2020/0106744 A1 | 4/2020 | Miriyala et al. |
| 2020/0137185 A1 | 4/2020 | Parekh |

OTHER PUBLICATIONS

Armstrong, D., et al., "Towards Energy Aware Cloud Computing Application Construction," Jun. 23, 2017, pp. 1-23.

Banerjee, P. K.; "Deploying a Service on a Kubernetes Cluster," Mar. 8, 2016, pp. 1-10.

Bhatia, J.; "A Dynamic Model for Load Balancing in Cloud Infrastructure," NIRMA University Journal of Engineering and Technology, Jan.-Jun. 2015, pp. 15-19, vol. 4, No. 1.

Coles et al., "Rapid Node Reallocation Between Virtual Clusters for Data Intensive Utility Computing", 2006 IEEE International Conference on Cluster Computing, Sep. 1, 2006 (Sep. 1, 2006), 10 pages.

Envoy Project Authors, "Load balancing", Jun. 28, 2018, 10 pages, envoy 1.8.0-dev-299591, retreived from internet: https://web.archive.org/web/20180628045225/https://www.envoyproxy.lo/docs/envoy/latest/intro/arc_overview/load_balancing.

European Search Report and Search Opinion Received for EP Application No. 19165945.7, dated Jul. 8, 2019, 11 pages.

European Search Report and Search Opinion Received for EP Application No. 19165946.5, dated Jul. 10, 2019, 10 pages.

F5 Networks, Inc. "Load Balancing 101: Nuts and Bolts," White Paper, May 10, 2017, pp. 1-8.

(56) References Cited

OTHER PUBLICATIONS

Istio Authors, "Discovery & Load Balancing", istio v0.5, Feb. 14, 2018, 2 pages, retreived from internet. https://istio.io/v0.5/docs/concepts/traffic-management/load-balancing.html.

Istio Authors, "Overview", Istio v0.5, Feb. 14, 2018, 2 pages, retreived from internet: https://istio.io/v0.5/docs/concepts/traffic-management/overview.html.

Kabar, N.; "Docker Reference Architecture: Service Discovery and Load Balancing with Docker Universal Control Plane (UCP 1.1)," 2017, pp. 1-16.

Michael Churchman, "Load-Balancing in Kubernetes," available online at <https://rancher.com/load-balancing-in-kubernetes>, Rancher, Aug. 14, 2017, 7 pages.

Openshift; "Application Health," 2017, pp. 1-2 [online], Retrieved from the Internet on Dec. 5, 2017 at URL: <docs.openshift.com/container-platform/3.4/dev_guide/application_health.html>.

Openshift; "Using a Service External IP to Get Traffic into the Cluster," 2017, pp. 1-7 [online], Retrieved from the Internet on Dec. 5, 2017 at URL: <docs.openshift.com/container-platform/3.4/dev_guide/expose_service/expose_internal_ip_service.html>.

Scholes, M.; "Deploy an App Into Kubernetes Using Advanced Application Services, " Jun. 22, 2017, pp. 1-11.

Slideshare.net; "Kubernetes and Software Load Balancers," Mar. 24, 2017, pp. 1-10 [online], Retrieved from the Internet on Dec. 5, 2017 at URL: <slideshare.net/haproxytech/kubernetes-and-software-load-balancers-73598367>.

The Openstack; "Load-Balancing Policy," Dec. 4, 2017, pp. 1-6.

Total Uptime, "Load Balancing and Failover Between AWS Regions," Aug. 19, 2015, pp. 1-3 [online], Total Uptime Technologies, LLC, Retrieved from the Internet on Dec. 5, 2017 at URL: <totaluptime.com/load-balancing-and-failover-between-aws-regions/>.

\* cited by examiner

CONTAINER CLUSTER MANAGEMENT

BACKGROUND

Containerized computing systems may provide a readily scalable architecture for the individual deployment of a plurality of programs which may utilize the same underlying resource.

BRIEF DESCRIPTION OF DRAWINGS

Non-limiting examples will now be described with reference to the accompanying drawings, in which.

DETAILED DESCRIPTION

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to. The term "based on" means based at least in part on.

Some computing systems employ 'containerization'. Containerization can take place at the operating system level. In some examples, mutually isolated computing instances, known as containers (or in some examples, by other terms such as virtualisation engines or partitions), operate as separate computers from the point of view of programs deployed thereon. While a deployed program may utilize, and be aware of, the resources of its container, it will generally be unaware of the resources of any other container, even where an underlying physical resources is shared.

Thus, a computing resource such as a computer, a server, or the like, may have part of its resources allocated to one container and another part allocated to another. Programs running within containers (and in some examples, there may be several programs running within each container) have access only to the resources allocated to the container. Such computing resources allow of ease of scalability and accessibility of the same underlying resource by mutually distrusting instances with little additional overhead. An example of a container manager and deployment system is Kubernetes.

In examples described herein, a processing resource may include, for example, one processing resource or multiple processing resources included in a single computing device or distributed across multiple computing devices. As used herein, a "processing resource" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. In examples described herein, entities may communicate with one another via direct connections, via one or more computer networks, or a combination thereof. In examples described herein, a computer network may include, for example, a local area network (LAN), a virtual LAN (VLAN), a wireless local area network (WLAN), a virtual private network (VPN), the Internet, or the like, or a combination thereof.

In examples described herein, a memory resource may include, for example Random Access Memory (RAM), including any variant thereof (e.g. DRAM, SRAM, etc.).

In examples described herein, a "node" entity is a virtualised processing resource, which may run on all or part of a computing device, such as a server, storage array, storage device, desktop or laptop computer, switch, router, or any other processing device or equipment including a processing resource. In some examples herein, a node may forward requests for services provided by one or more containers, which may be organised into sub-clusters or 'pods', as is described in greater detail below.

Figure 1:
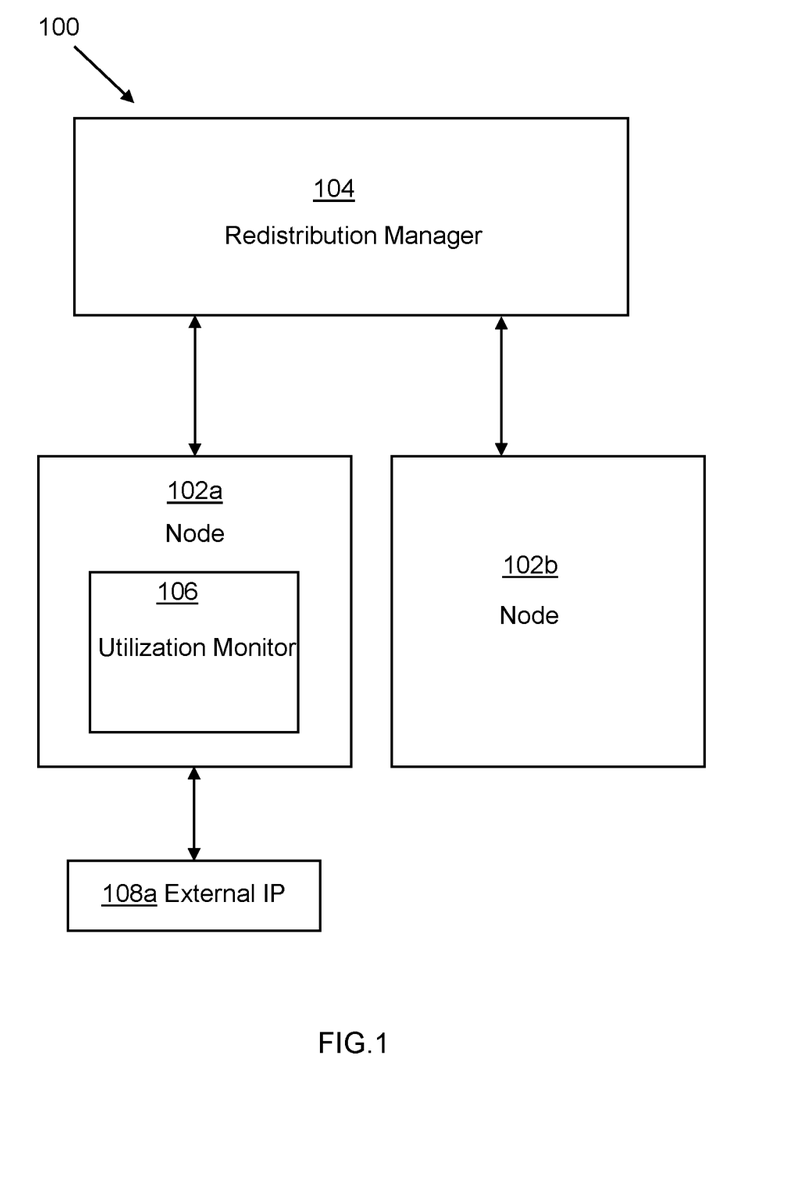
FIG. 1 is a block diagram of an example of a container cluster management system.

FIG. 1 is an example of a container cluster management system 100 comprising nodes 102a and 102b (also referred to generally or collectively as node(s) 102) and a redistribution manager 104. A node 102a includes a utilization monitor 106. In some examples, each node 102 of the system 100 may comprise a utilization monitor 106. In other examples, some nodes of the system 100 may comprise a utilization monitor 106 whereas other nodes of the system 100 may not. The node 102a has an external IP address 108a allocated to it. In some examples, the external IP address 108a may initially be allocated to the node 102a by the redistribution manager 104. In some examples, the container cluster management system 100 is manage a plurality of container sub-clusters, each sub-cluster comprising a plurality of containers and having a sub-cluster IP address; and the nodes 104 are to forward service requests associated with the external IP address to a container sub-cluster by translating the external IP address to a sub-cluster IP address.

In use of the system 100, the utilization monitor 106 provides data relating to the utilization level of the node 102a, to the redistribution manager 104. This data may comprise 'health status' data, and may be indicative of the loading of the node 102a. In some examples, the data relating to the utilization level of the node 102a relates to at least one of processing resource usage, memory usage and data for mapping requests per second to utilization. In some examples, the utilization monitor 106 continuously monitors a utilization status of the node 102a, however in some examples the utilization monitor 106 acquires the data relating to the utilization level periodically. In some examples the utilization monitor 106 shares the utilization data of the node 102a with the redistribution manager 104 periodically.

Once utilization of a node 102 reaches a certain maximum level (i.e. 100% utilization), failure of the node 102 may occur, causing the node to become unresponsive.

The redistribution manager 104 determines, based on the data from the utilization monitor 106, whether the utilization level of the node 102a has exceeded a predetermined threshold. In some examples, the predetermined threshold may be set below a level where failure of the node 102a is likely to occur. In some examples, the predetermined threshold may be a value representing between 80% and 95% of maximum utilization of the node 102*a*, where maximum utilization represents the maximum amount of requests per second that can be handled by a processing resource or a memory resource. For example, the predetermined threshold may be set at 90% of maximum utilization of the node 102*a* and if either or both of the processing resource utilization or memory resource utilization reaches 90% of maximum then the predetermined threshold has been reached. In some examples, the threshold value can be configured by a user of the system 100. In response to determining that the utilization level of the node 102*a* has exceeded the predetermined threshold, the redistribution manager 104 reallocates the external IP address 108*a* from the node 102*a* to a different node 102*b* of the container cluster management system. In some examples, reallocating the external IP address involves updating a Virtualised Router-to-IP Address (VRID-to-IP) mapping table and sending it to an API server associated with the containerized computing system.

This provides load redistribution (also referred to as load balancing) between nodes of the container cluster management system 100, which may reduce instances of node failure caused by high utilization level, while maintaining servicing of the external IP addresses 108 so that there is no outage in the reachability of a service or application associated with an external IP address 108.

The system 100 also enables the dynamic load redistribution of applications or services which have already been deployed and are running on the nodes by redistributing the already configured external IP addresses from highly loaded nodes to less loaded nodes.

Each of the redistribution manager 104, nodes 102*a*, 102*b* and the utilization monitor 106 may be any combination of hardware and programming to implement the described functionalities. In examples described herein, such combinations of hardware and programming may be implemented in a number of different ways. For example, programming may be processing resource executable instructions stored on at least one non-transitory machine-readable storage medium and the hardware may include at least one processing resource to execute those instructions. In some examples, the hardware may also include other electronic circuitry to at least partially implement at least one of the redistribution manager 104, nodes 102*a*, 102*b* and the utilization monitor 106. In some examples, the at least one machine-readable storage medium may store instructions that, when executed by the at least one processing resource, at least partially implement some or all of the redistribution manager 104, nodes 102*a*, 102*b* and the utilization monitor 106. In such examples, a computing device at least partially implementing the processing redistribution manager 104 and/or a node 102*a*, 102*b* may include the at least one machine-readable storage medium storing the instructions and the at least one processing resource to execute the instructions. In other examples, the redistribution manager 104, the nodes 102*a*, 102*b* and the utilization monitor 106 may be implemented by electronic circuitry.

Figure 2:
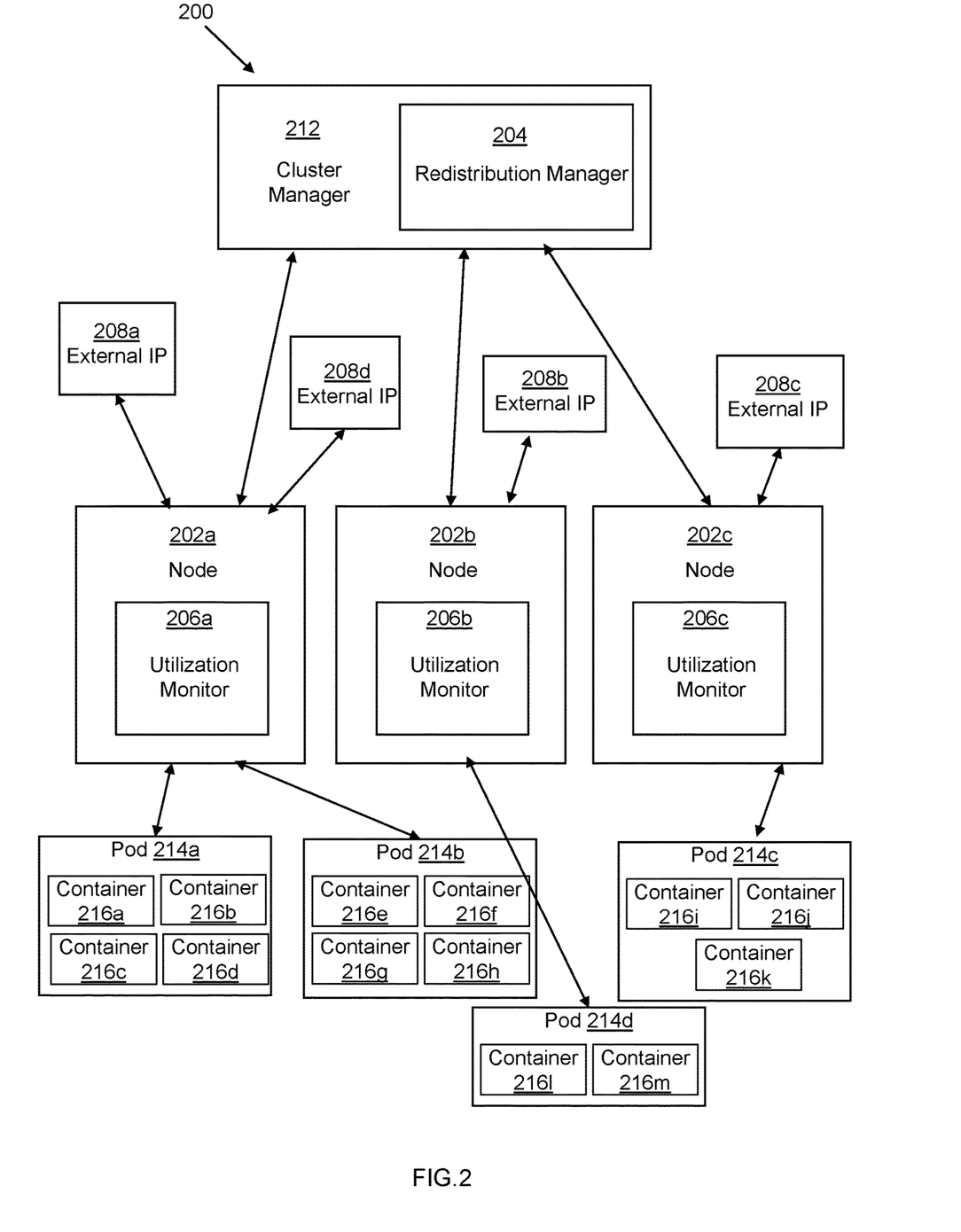
FIG. 2 is a block diagram of another example of a container cluster management system.

FIG. 2 is an example of a container cluster management system 200 comprising a plurality of nodes 202*a-c*, each comprising a utilization monitor 206*a-c*. The cluster management system 200 further comprises a cluster manager 212 including a redistribution manager 204. In use of the system 200, the cluster manager 212 provides access to services provided by containers within the system 200. The cluster manager 212 may be any combination of hardware and programming to implement the described functionalities.

A service may comprise a predetermined set of 'pods' 214*a-d*, where a pod 214 is a logical host of a set of containers 216*a-m* or, expressed another way, a pod 214 comprises a sub-cluster of related containers 216. For example, the containers 216 of a particular pod 214 (e.g. with reference to FIG. 2, the containers 216*a-d* of pod 214*a*, the containers 216*e-h* of pod 214*b*, the containers 216*i-k* of pod 214*c* or the containers 216*l-m* of pod 214*d*) may be co-located and co-scheduled, and run in a shared context. The pods 214 may be configured independently of one another and may provide different services. Containers 216 within a pod 214 may share an IP address and/or port space, and may be able to communicate with one another (whereas, generally, containers 216 in different pods 214 may have distinct IP addresses and are not typically in direct communication with one another, instead communicating via Pod IP addresses and the like). Applications deployed within a pod 214 may have access to shared 'volumes', which are usually directories, in some examples holding data. Such volumes may be logically considered to be part of a pod, and may have the same life cycle as a pod. To consider a particular example, a pod 214 may comprise frontend and backend containers 216, where the frontend containers may provide user interfaces and the like and the backend containers may provide databases, data processing and the like. The containers 216 of a pod 214 may work together to provide a service.

A pod (as well as an individual container) may be a temporary configuration. Pods 214 may be created, assigned a unique ID, and scheduled to at least one node 202 where they remain until termination (according to restart policy) or deletion. If a node 202 fails, the pods scheduled to that node 202 may be scheduled for deletion, for example after a timeout period.

In some examples, in use of the system 200, the node 202 forwards a service request for a first service received via the cluster manager 212 to at least one container sub-cluster (i.e. in the example of FIG. 2, one of pods 214*a* and 214*b*) by translating the external IP destination address of the service request to an IP address of a container sub-cluster (which may comprise one or more pods 214). For example this may utilize Destination Network Address Translation (DNAT) and redirect the incoming traffic to the pod or pods which make up the service identified by the IP address. In some such examples, a pod's reply may be routed back to a service IP address, i.e. the node 202, and then forwarded thereby to a client.

In other words, the method may be carried out at what may be termed a 'worker node' of a containerised computing system. Such nodes may comprise resources to run container sub-clusters (for example, pods), and may redirect the requests but it may be noted that the nodes do not themselves carry out the requested computing. Thus, in such examples, the utilization of the containers/pods 'behind' each node may be balanced effectively indirectly by considering the utilization level of the node which redirects requests to the container sub-cluster.

Each node of the plurality of nodes 202*a-c* shown in FIG. 2 has been allocated an external IP address 208*a-c*. One of the nodes 202*a* has additionally been allocated a further external IP address 208*d*. In some examples, some or all of the nodes 202*a-c* may be allocated a plurality of external IP addresses or some of the nodes may only be allocated one, or no external IP address. In some examples, the external IP addresses may be allocated to the nodes by the cluster manager 212. As shown in FIG. 2, each node 202 is associated with at least one pod 214. A first node 202*a* is to receive service requests sent to external IP addresses 208a and 208d, and to forward those service requests to, respectively, a first 214a and second pod 214b. A second node 202b is to receive service requests sent to external IP address 208b, and to forward those service requests to a third pod 214c. A third node 202b is to receive service requests sent to external IP address 208c, and to forward those service requests to a third pod 214d. In other examples, however, there may be other arrangements and the relationship between external IP addresses and services need not be one-to-one as shown in this example.

In use of the system 200, the utilization monitor 206 provides data relating to the utilization level of the nodes 202a-c to the redistribution manager 204. In some examples, the utilization monitor 206 monitors a utilization status or level of each of the nodes 202a-c and periodically populates a table, termed herein a 'health status table' stored in a memory of the redistribution manager 204 with data relating to the utilization level of each of the nodes 202a-c. In some examples, the redistribution manager 204 may traverse such a health status table to determine if the utilization level of any of the nodes 202a-c has exceeded the predetermined threshold.

In response to determining that the utilization level of a node 202a has exceeded the predetermined threshold, and that therefore the node 202a is considered unhealthy, the redistribution manager 204 reallocates an external IP address 208 from the node 202a to a different node 202 of the container cluster management system 200. In some examples, reallocating the external IP address involves updating a VRID-to-IP map (or lookup table) for the health status table. In some examples, this updated map may be sent it to an API server associated with the container cluster system.

The system 200 is robust as it prevents outage in load distribution of network traffic among backend members of the container sub-clusters even when a node becomes unhealthy.

Figure 3:
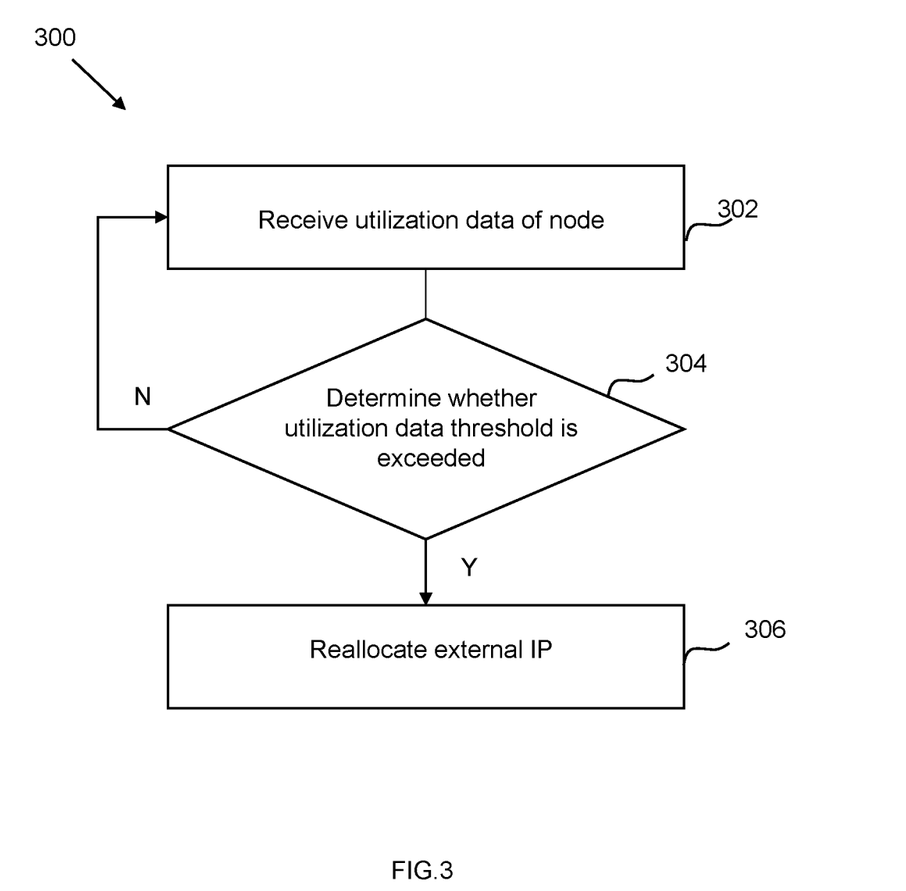
FIG. 3 is a flow chart of an example of a method of managing a containerized computing system.

FIG. 3 is a flowchart showing an example of a method 300, which may be a method of managing a container-based computing cluster. Block 302 comprises receiving, at a redistribution manager of a container cluster system, utilization data of a first node of the container cluster system which has an allocated external IP address. In some examples, the nodes may forward service requests associated with the external IP address to a container sub-cluster by translating the external IP address to a sub-cluster IP address. Block 304 comprises determining whether the utilization data of the node indicates that the utilization level of the node has exceeded a predetermined threshold and that therefore the node is at risk of becoming unresponsive. If this is not the case, the method returns to block 302 and the redistribution manager continues to receive utilization data for the node. However, if the utilization data has exceeded the predetermined threshold, the method proceeds to block 306 which comprises reallocating the external IP address originally assigned to the first node to a different node of the container cluster system by the redistribution manager, thereby reducing the utilization level of the first node. In some examples, the method 300 may be carried out by a redistribution manager 104 of a system 100 as described in relation to FIG. 1.

Figure 4:
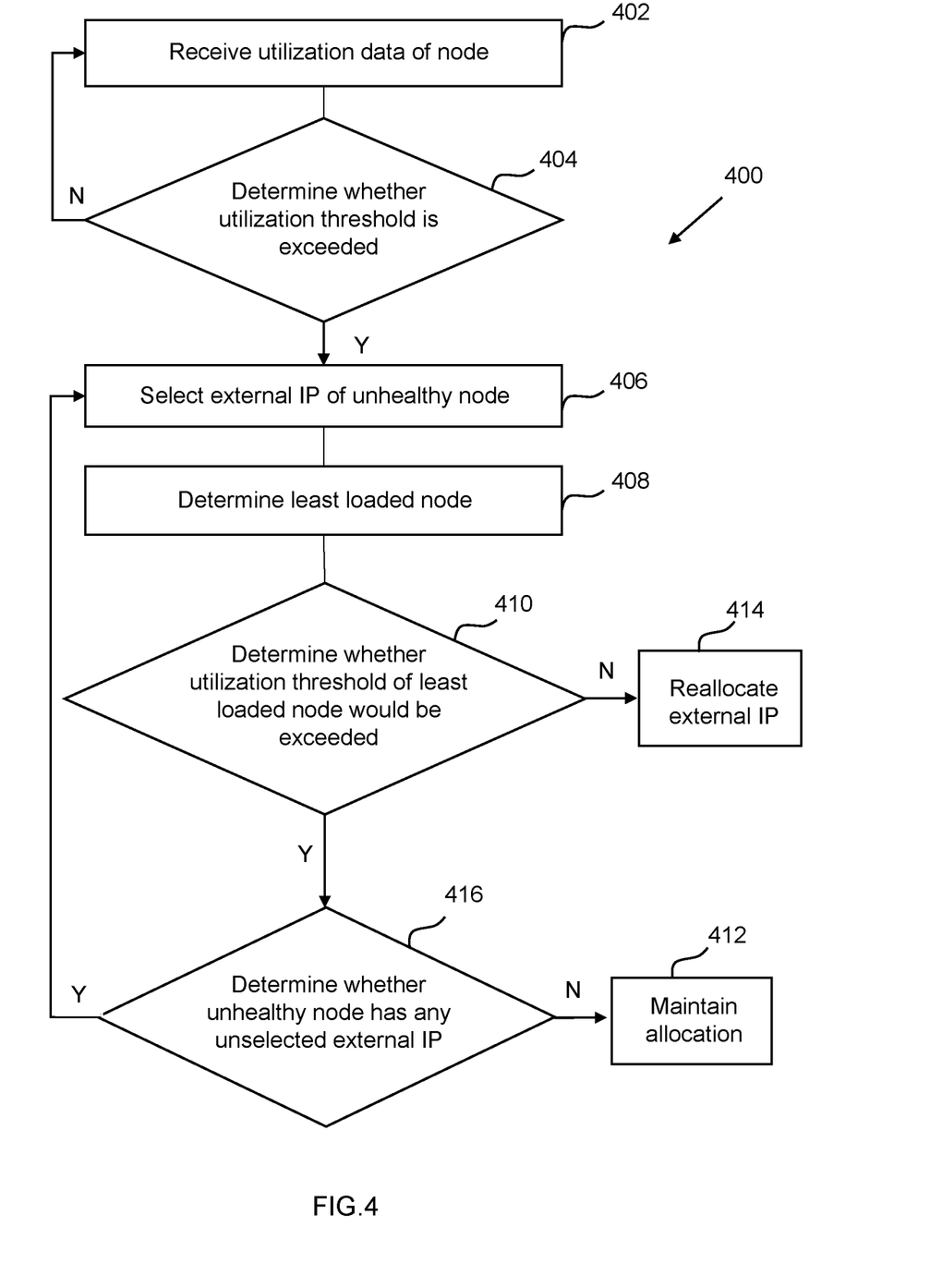
FIG. 4 is a flow chart of another example of a method of managing a containerized computing system.

FIG. 4 is a flowchart showing another example of a method 400, which may be a method of managing a container-based computing cluster. In some examples, the method 400 may be carried out by a redistribution manager 204 as described in relation to FIG. 2. Similarly to the method described in relation to FIG. 3, block 402 comprises receiving utilization data from a utilization monitor of a node and block 404 comprises determining whether the utilization level of the node exceeds a predetermined threshold. For example, referring back to FIG. 2, the redistribution manager 204 of FIG. 2 may receive data from utilization monitor 206a of node 202a and may determine that node 202a is unhealthy because the utilization level exceeds a predetermined threshold, which may be a percentage utilization (for example, 90% of maximum possible utilization).

At block 406, an external IP address of the unhealthy node is selected, for example by selecting from the health status table. For example, redistribution manager 204 may select an external IP address 208a to potentially reallocate to a different node.

At block 408 the least loaded node in the plurality of nodes is determined and is allocated as a target node to receive the reallocation of the external IP address. In some examples the least loaded node is determined from utilization data stored in a health status data table. For example, referring back to FIG. 2, the redistribution manager 204 may determine that node 202c has the lowest utilization level and is therefore the least loaded node. The redistribution manager 204 may therefore allocate node 202c as a target node to potentially receive a reallocated external IP address 208a. In other examples, any node having a utilization level below a threshold may be selected. This means that the third node 202c would now perform address translation for accessing services provided by the first pod 214a in place of the first node 202a.

In some cases, the least loaded node (or any target node for reallocation) could become overloaded and fail if the external IP address is reallocated to it. Therefore, in this example, at block 410, the redistribution manager performs a check to determine whether the utilization level of the target node will exceed a predetermined threshold if the external IP address is reallocated to it. In some examples, performing the check comprises determining the number of requests received per second for the external IP address, calculating the average utilization level increase per request, and multiplying the number of requests by the average utilization increase per request, thereby calculating an estimate for the total utilization level increase that will occur due to reallocating the external IP address. In some examples, the average utilization level increase per request may be based on an average detected utilization level due to a known number of actual requests that have been received by the nodes. In some examples, determining the utilization level increase includes determining the increase in both memory resource usage and the increase in processor resource usage of a node.

If the system determines that the utilization level of the target node would exceed the predetermined threshold for the target node if the external IP address were to be reallocated, the method 400 proceeds to block 412 which comprises maintaining the allocation of the external IP address to the original node and optionally sending a notification to a user or admin of the container cluster management system requesting node scaling (i.e. the addition of one or more nodes to the system).

In some examples, if the external IP address cannot be reallocated without the utilization level of the target node being exceeded, the system determines, at block 416, whether the unhealthy node has any further external IP addresses allocated to it. If this is the case, the method returns to block 406 and a second external IP address is selected and the system then determines if it would be possible to reallocate the second external IP address without exceeding the predetermined threshold for the target node. If so, the second external IP address is reallocated to the target node. If reallocation of the second external IP address would cause the target node to become unhealthy, then the system determines whether the unhealthy node has a third allocated external IP address for potential reallocation. This process is iterated until either a suitable external IP address is found or all of the external IP addresses allocated to the unhealthy node have been checked. If none of the external IP addresses of the unhealthy node can be reallocated then the method continues to block 412 and the original allocation of external IP addresses is maintained.

If the system determines that the utilization level of the target node would not exceed the threshold if the external IP address were it to be reallocated then the method 400 proceeds to block 414 which comprises reallocating the external IP address to the target node. For example, redistribution manager 204 may reallocate external IP address 208a to node 202c.

Figure 5:
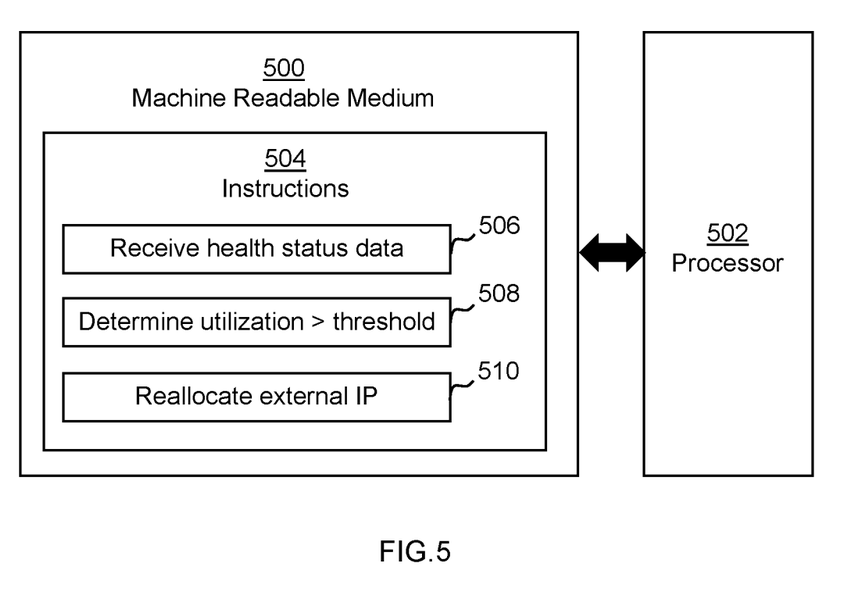
FIG. 5 is a representation of a machine readable medium in association with processing circuitry.

FIG. 5 is an example of a tangible and non-transitory machine readable medium 500 in association with a processor 502. The machine readable medium stores instructions 504 which, when executed, cause the processor to carry out certain processes. The instructions 504 comprise instructions 506 to cause the processor to receive health status data providing an indication of a utilization level of a node having an allocated external IP address; instructions 508 to cause the processor to determine, based on the health status data, that a utilization of the node exceeds a predetermined threshold; and, instructions 510 to, in response to this determination, reallocate an external IP address of the node to a different node. In some examples, the machine readable medium stores further instructions which, when executed, cause the processor to carry out a process described in relation to FIG. 3 or FIG. 4.

Examples in the present disclosure can be provided as methods, systems or machine readable instructions, such as any combination of software, hardware, firmware or the like. Such machine readable instructions may be included on a machine readable storage medium (including but not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and/or block diagrams, as well as combinations of the blocks in the flow charts and/or block diagrams can be realized by machine readable instructions.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other processing resource may fulfil the functions of several units recited in the claims.

The features of any dependent claim may be combined with the features of any of the independent claims or other dependent claims, in any combination.

The invention claimed is:

1. A system comprising:
a processing resource; and
a non-transitory computer-readable medium, coupled to the processing resource, having stored therein instructions that when executed by the processing resource cause the processing resource to:
receive, from a utilization monitor, utilization data of a set of resources of a first node of a plurality of nodes of a container-based computing cluster, wherein the first node has an allocated external Internet Protocol (IP) address, wherein the first node forwards a first received request for a service that is associated with the allocated external IP address to a first pod run by the first node, the first pod comprising a plurality of first containers that work together to provide the service;
populate, by the utilization monitor, a health status table stored in a memory coupled to the processing resource;
determine, by traversing the health status table, that a utilization of the first node has exceeded a predetermined threshold; and
responsive to the utilization exceeding the predetermined threshold, reallocate the external IP address from the first node to a second node of the plurality of nodes, wherein the second node forwards a second received request for the service that is associated with the allocated external IP address to a second pod run by the second node, the second pod comprising a plurality of second containers that work together to provide the service.

2. The system of claim 1, wherein the first pod is one of a first set of pods run by the first node.

3. The system of claim 2, wherein the first containers work together to provide the service using the set of resources.

4. The system of claim 1, wherein the utilization data is indicative of a percentage utilization of at least one of a processing resource or a memory resource of the set of resources.

5. The system of claim 4, wherein the predetermined threshold is a percentage utilization between 80% and 95%.

6. The system of claim 1, wherein reallocating the external IP address comprises updating a lookup table associated with the health status table.

7. The system of claim 6, wherein the instructions further cause the processing resource to:
send the updated lookup table to an application programming interface (API) server associated with the container-based computing cluster.

8. The system of claim 1, wherein the instructions further cause the processing resource to:
calculate an estimate of a total utilization level increase that will occur due to reallocating the external IP address;
determine that a utilization level of the second node will exceed the predetermined threshold; and maintain allocation of the external IP address to the first node.

9. The system of claim 1, wherein the instructions further cause the processing resource to:
determine that the second node has a utilization level below a threshold based on the health status table.

10. A method comprising:
receiving at a redistribution manager, from a utilization monitor, utilization data of a set of resources of a first node of a plurality of nodes of a container-based computing cluster, wherein the first node has an allocated external Internet Protocol (IP) address, wherein the first node forwards a first received request for a service that is associated with the allocated external IP address to a first pod run by the first node, the first pod comprising a plurality of first containers that work together to provide the service;
populating, by the utilization monitor, a health status table stored in a memory of the redistribution manager;
determining, by traversing the health status table, that a utilization of the first node has exceeded a predetermined threshold; and
responsive to the utilization exceeding the predetermined threshold, reallocating the external IP address from the first node to a second node of the plurality of nodes, wherein the second node forwards a second received request for the service that is associated with the allocated external IP address to a second pod run by the second node, the second pod comprising a plurality of second containers that work together to provide the service.

11. The method of claim 10, wherein the first pod is one of a first set of pods run by the first node.

12. The method of claim 11, wherein the first containers work together to provide the service using the set of resources.

13. The method of claim 10, wherein the utilization data is indicative of a percentage utilization of at least one of a processing resource or a memory resource of the set of resources.

14. The method of claim 10, wherein reallocating the external IP address comprises updating a lookup table associated with the health status table.

15. The method of claim 14, further comprising:
sending the updated lookup table to an application programming interface (API) server associated with the container-based computing cluster.

16. The method of claim 10, further comprising:
determining that the second node has a utilization level below a threshold based on the health status table.

17. The method of claim 10, further comprising:
calculating an estimate of a total utilization level increase that will occur due to reallocating the external IP address;
determining that a utilization level of the second node will exceed the predetermined threshold; and
maintaining allocation of the external IP address to the first node.

18. A non-transitory machine-readable medium storing instructions that, when executed by a processing resource, cause the processing resource to:
receive, from a utilization monitor, utilization data of a set of resources of a first node of a plurality of nodes of a container-based computing cluster, wherein the first node has an allocated external Internet Protocol (IP) address, wherein the first node forwards a first received request for a service that is associated with the allocated external IP address to a first pod behind the first node, the first pod comprising a plurality of first containers that work together to provide the service;
populate, by the utilization monitor, a health status table stored in a memory coupled to the processing resource;
determine, by traversing the health status table, that a utilization of the first node has exceeded a predetermined threshold; and
responsive to the utilization exceeding the predetermined threshold, reallocate the external IP address from the first node to a second node of the plurality of nodes, wherein the second node forwards a second received request for the service that is associated with the allocated external IP address to a second pod behind the second node, the second pod comprising a plurality of second containers that work together to provide the service.

19. The non-transitory machine-readable medium of claim 18, wherein the instructions to reallocate the external IP address comprise instructions to:
update a lookup table associated with the health status table; and
send the updated lookup table to an application programming interface (API) server associated with the container-based computing cluster.

20. The non-transitory machine-readable medium of claim 18, wherein the instructions further cause the processing resource to:
calculate an estimate of a total utilization level increase that will occur due to reallocating the external IP address;
determine that a utilization level of the second node will exceed the predetermined threshold; and
maintain allocation of the external IP address to the first node.

* * * * *